Dec. 8, 1959  E. C. L. DE FAYMOREAU  2,916,737
NAVIGATION SYSTEM WITH BEACON IDENTIFICATION
Filed June 25, 1957  3 Sheets-Sheet 2

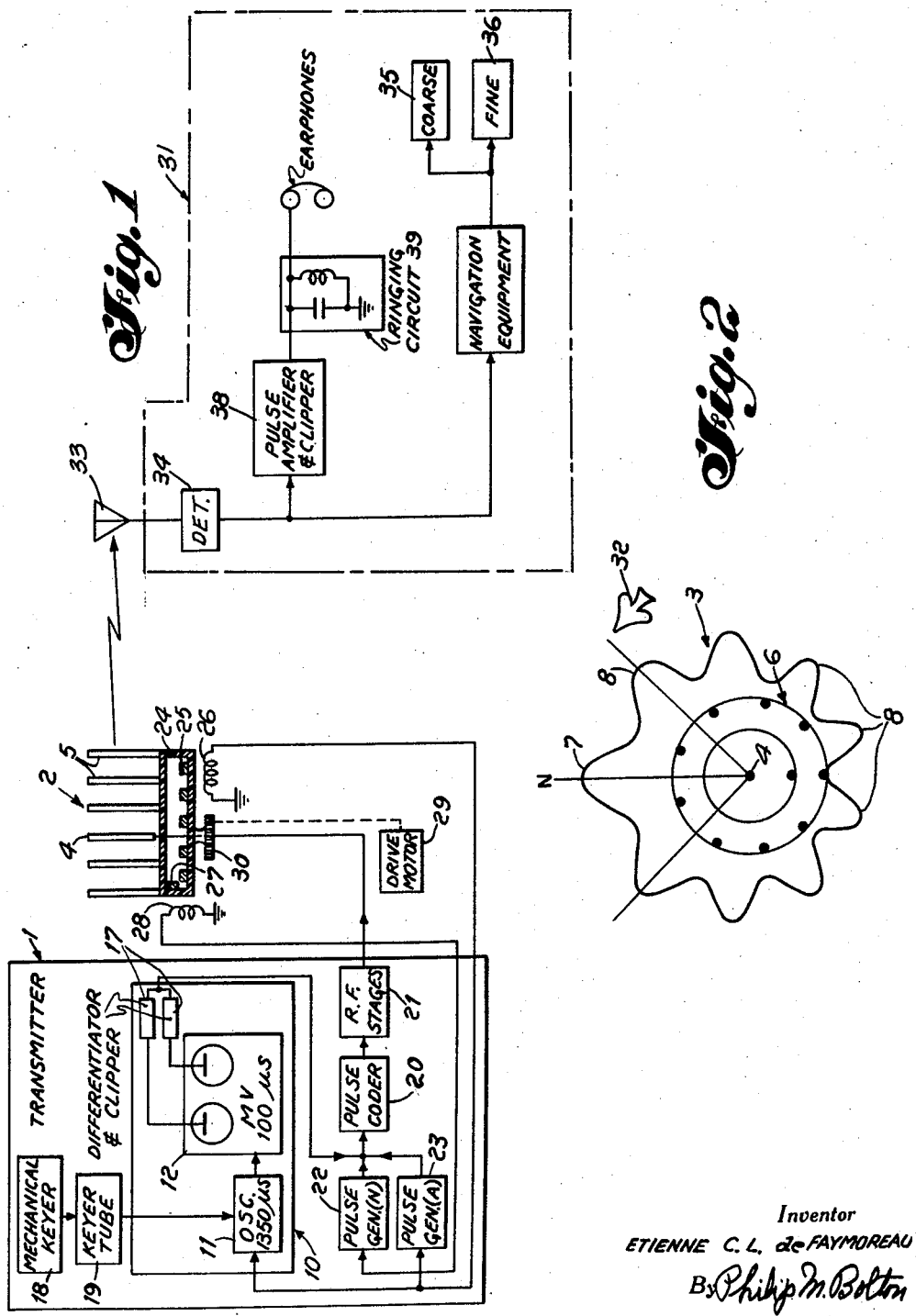

Inventor
ETIENNE C. L. de FAYMOREAU
By Philip M. Bolton
Attorney

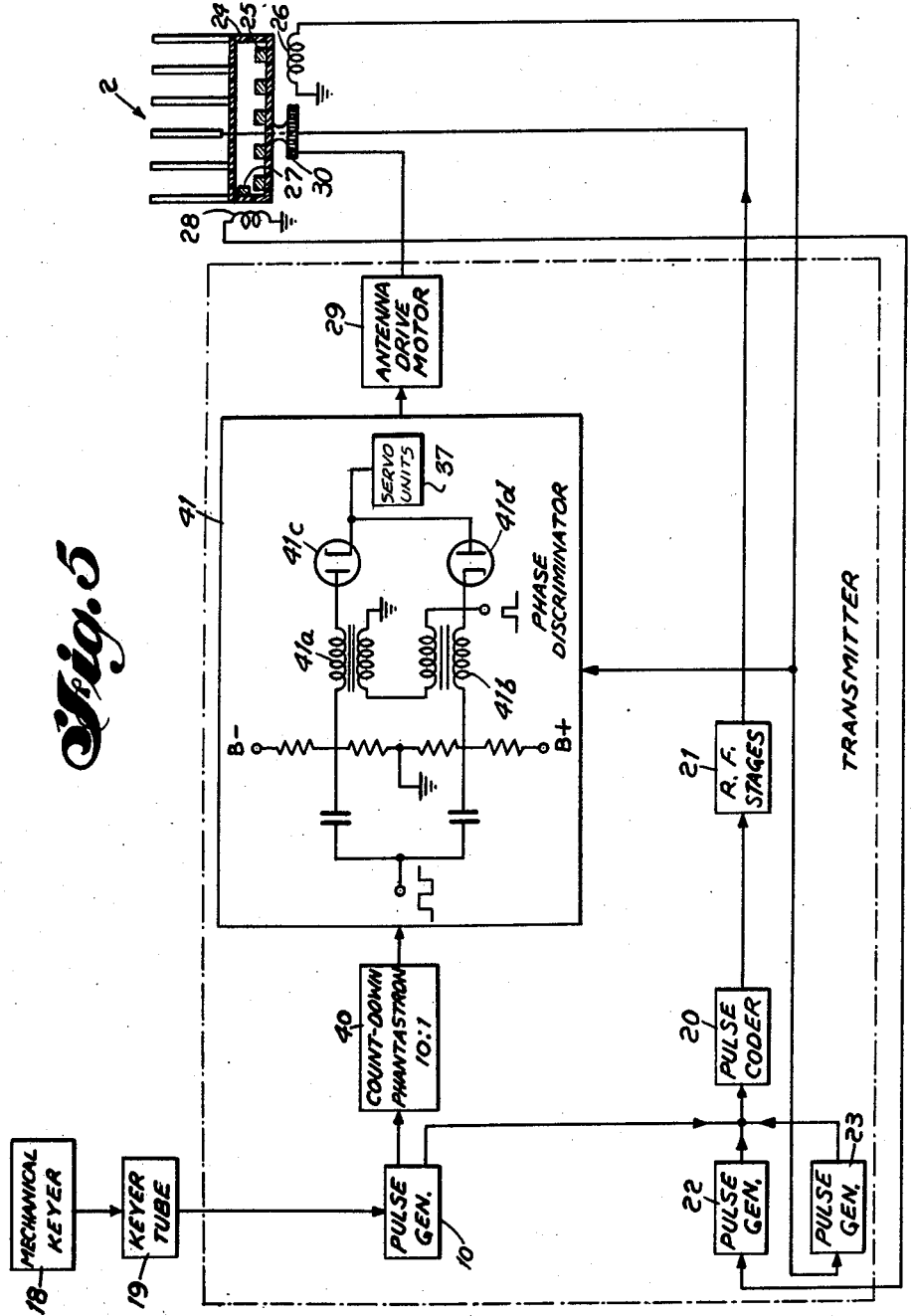

United States Patent Office 2,916,737
Patented Dec. 8, 1959

2,916,737

NAVIGATION SYSTEM WITH BEACON IDENTIFICATION

Etienne C. L. de Faymoreau, Nutley, N.J., assignor to International Telephone and Telegraph Corporation, Nutley, N.J., a corporation of Maryland Application June 25, 1957, Serial No. 667,937

6 Claims. (Cl. 343—106)

This invention relates to navigation systems and particularly to those in which a beacon station transmits, in addition to navigation information, signals identifying the station.

In certain aerial navigation systems, such as Tacan, azimuthal information is given by the relative phase between reference signals and a multilobed rotating antenna pattern, which phase varies at different azimuthal positions with respect to the beacon. The production and transmission of the reference signals is phase locked to the rotation of the antenna so that, for example, as each lobe of the antenna directional pattern points north, a reference signal is emitted. In the system described, all the signals emitted are in the form of pulses (or groups of pulses).

In order to supply information as to the identity of the beacon station, it has been proposed to transmit at frequent intervals a train of pulses having an audio frequency repetition rate. These audio tone pulses actuate a ringing circuit in the mobile equipment to produce a tone, which tone is keyed at the beacon in accordance with a code identifying the beacon station.

It has been noticed that an annoying wobble and distortion of this audio tone making it scarcely intelligible has occurred. It has been discovered that this problem with respect to the audio tone is produced by the action of the reference signals on the ringing circuit in the mobile equipment which interrupt the normal ringing thereof. In the Tacan system the reference signals are repeated at a rate of about 135 cycles per second, while the audio frequency of the ringing circuit is about 1350 cycles per second. The reference signals are directly derived from the rotation of the antenna pattern and are generated by the mechanism associated with the mechanism that rotates the pattern. On the other hand, the 1350 cycles per second tone pulses are independently generated. It has been discovered that this problem of distortion of the audio identity signal is due to a shift in phase between the reference signals and the tone pulses.

An object of the present invention is the provision of an improved navigation system of a type providing identifying signals.

Another object of the present invention is the provision in a navigation system of the rotating radiation pattern type which provides identity tone signals, of an arrangement for preventing relative phase shifts between the reference signals and the tone signals.

In accordance with a feature of the present invention, the antenna radiation pattern rotating system which controls the generation of the reference pulse signals and the identity tone pulse generator are locked in phase.

In accordance with one embodiment of the present invention, the rotation of the mechanism which produces the rotating antenna pattern and the reference signals controls the oscillator which produces the identity tone pulses to thereby lock the tone signals in phase with the reference signals.

In accordance with an alternative embodiment of the present invention, the mechanism rotating the antenna's radiation pattern is controlled by the oscillator producing the tone pulse signal.

Other and further objects of the present invention will become apparent and the foregoing will be better understood with reference to the following description of embodiments thereof, reference being had to drawings, in which:

Fig. 1 is a simplified block diagram of a Tacan type beacon transmitter and mobile receiver;

Fig. 2 is a diagram of the radiation pattern of the antenna of the beacon;

Fig. 5 is a simplified block diagram of an alternate arrangement in which the antenna pattern rotation system is controlled by the identity tone pulse generator.

Figure 3:
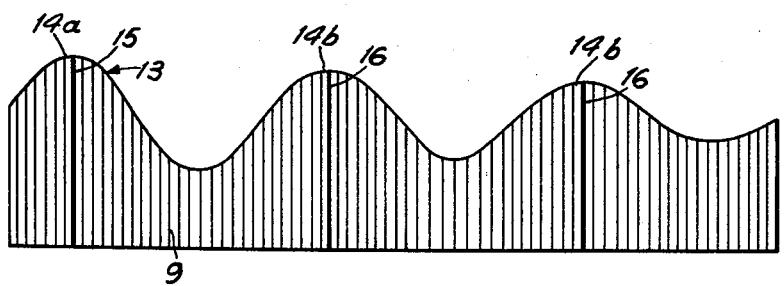
Fig. 3 is a curve showing qualitatively the effective amplitude modulation envelope of the pulses transmitted from the beacon.

Referring now to Fig. 1, a beacon station 1 emits pulses from its rotating antenna 2 according to a multi-lobed directional pattern 3, such as shown in Fig. 2. The pattern is rotated at the rate of 15 cycles per second. The antenna system may consist of a central omnidirectional antenna 4 with passive reflectors 5 spaced thereabout at 40-degree separation, the reflectors being, for example, printed on a pair of cylinders 6 which rotate around the central radiator 4, the pattern consisting of a major lobe 7 with nine minor lobes 8 spaced every 40 degrees.

The identity tone signal is generated by a pulse generator 10 in the beacon which may be, for example, a plate coupled Hartley oscillator 11, feeding a one-shot multivibrator 12, having a period of oscillation of 100 microseconds. Output pulses from each anode are differentiated and clipped in a differentiater and clipper 17 and combined to provide two pulses of the same polarity and spaced at 100 microseconds for each cycle of the oscillator 11. A mechanical keying device 18 keys the keyer 19 with the prearranged international Morse code signal which identifies the transmitting radio beacon. The pulse generator 10 when keyed on produces corresponding trains of pulse pairs in accordance with a letter in Morse code. These pulses are then applied to a pulse coder 20 which changes each single pulse into a pair of pulses spaced 12 microseconds between the pulses of each pair. These identity tone signals are transmitted at regular intervals, about every half minute. The pulses from coder 20 are used to key or modulate RF oscillator or amplifier stages 21, and the RF pulses are then fed to the antenna system from whence they are emitted according to the directional pattern 3 of Fig. 2. In the aircraft, its receiver detects these regularly occuring pulses and reproduces the code as a keyed 1350 cycle per second audio tone. The rotation of the antenna reflectors, in effect, produces an amplitude modulation envelope 13 (Fig. 3) of the pulses with a maximum amplitude peak 14a corresponding to the maximum lobe 7 and the other peaks 14b corresponding to the minor lobe 8. The multilobed antenna pattern which is rotating at 15 cycles per second produces a modulation envelope of 135 cycles per second (nine lobes multiplied by 15 cycles per second), on top of the fundamental of 15 cycles per second. The phase of this envelope varies at different azimuthal angles from the beacon stations.

As the antenna system 2 rotates so that the major lobe 7 passes a given reference direction, such as, for example, north, a reference pulse signal is emitted which is called hereinafter the "main" or "north" reference signal. The north signal may be produced by pulse generator 22 which produces 12 pulses separated by 30 microseconds which pulses are applied to the pulse code 20 thereby producing 12 pulse pairs or 24 pulses with the spacing between the pulses of the pairs being 12 microseconds. While the north signal 15 is shown as a solid black line in Fig. 3, it actually consists of the aforementioned pulse group.

As each minor lobe 8 passes the reference direction, remembering that the minor lobes are spaced by 40 degrees from each other, an "auxiliary" reference signal 16 is emitted. The auxiliary signal 16 may be generated by generator 23 which produces a burst of 6 pulses spaced 24 microseconds apart from leading edge to leading edge. The pulses from generator 23 are fed into the pulse coder 20 where the six pulses are then doubled to become six pairs of pulses or 12 pulses with a 12 microsecond spacing between adjacent pulses. Generators 22 and 23 may consist of conventional pulse generators feeding tapped delay lines or ringing circuits to produce the desired number of pulses with the proper spacing for the main or auxiliary reference groups as described above.

In accordance with one embodiment of the invention, a suitable timing means which can take any one of the various forms well known in the art is associated not only with the antenna system 2 and pulse generators 22 and 23 to cause the "north" and auxiliary signals to be emitted at the proper time, but it is also associated with pulse generator 10 to control its operation too. For example, a pulser plate 24 may be provided at the bottom of the antenna arrangement 2 having a number of soft iron slugs 25 equal in number to the number of lobes and spaced therearound. A pickup coil 26 is positioned so that as each of the slugs passes it, a pulse is produced. These pulses are used to trigger pulse generator 23. These pulses are likewise applied to pulse generator 10 to phase lock the identity tone pulses produced thereby with the rotation of the antenna 2 in a manner, for example, which will be described more fully hereinafter with respect to Fig. 4. A single slug 27 is also positioned on the periphery of the pulser plate 24 and operates with a separate pickup coil 28 to produce pulses to trigger the north or main pulse generator 22. A driving motor 29 is used to rotate the antenna system through a suitable gear train 20a.

The emitted pulses are received on a receiver 31 located in a mobile vehicle 32 (Fig. 2) such as, for example, an airplane. The signal is picked up on an omnidirectional antenna 33 and fed to detector 34 which removes the RF envelope and detects the signal. In the receiver 31, the difference in phase between the modulation envelope (due to rotation of the beacon pattern) with that of the "north" signal is compared and a course indication of bearing of the receiver with respect to the beacon is obtained on course indicator 35. In addition, the phase of the auxiliary pulse signal with respect to the 135 cycle per second modulation envelope component is compared, and a fine azimuthal indication is thereby obtained on fine indicator 36.

Figure 4:
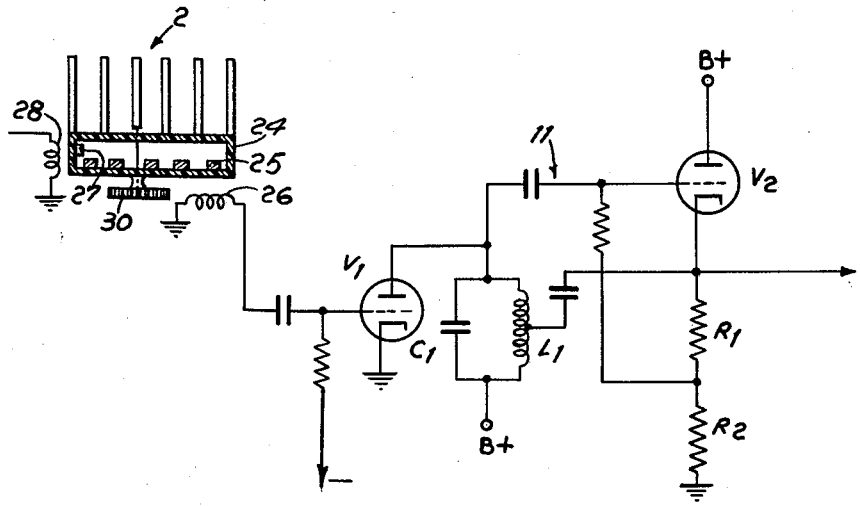
Fig. 4 is a circuit diagram of one means to synchronize the identification tone signal generator with the antenna pattern radiation system.

Both the identity tone pulses and the reference pulse signals, after being shaped to a uniform amplitude, for example, by a pulse amplifier and clipper 38 are applied to a ringing circuit 39. It has been discovered that due to the fact that in the prior art the identity tone pulses drift in phase with respect to the reference pulses ("north" and "auxiliary") as they impinge on the ringing circuit 39 of the receiver 31, an amplitude distortion is caused in the identity tone signal. By phase locking both these signals at the transmitter, we can prevent drift and the resulting distortion in the identity tone signals. One arrangement for accomplishing this is illustrated in Fig. 4. The 135 cycle per second trigger from the antenna pulser plate 24 via its pickup coil 26 is fed into oscillator 11. The output of pickup coil 26 is fed directly or via a pulse generator or amplifier into the grid of the identity tone pulse oscillator 11. The plate circuit of this oscillator which may be, for example, a plate coupled Hartley oscillator, is tuned by means of L1C1 to resonance at the tenth harmonic of the 135 cycle per second, that is, to 1350 cycles per second. Initially, V2 is operating at its natural frequency of 1350 cycles per second and V1 is non-conducting. The 135 cycle per second reference pulses are fed into V1 at the rate of one pulse for every 10 cycles of the identity tone signal. The output pulses of V1 are then applied to the tank circuit L1C1 thereby phase-locking the 1350 cycles per second signal to the 135 cycle per second reference pulses.

In accordance with an alternative embodiment of the present invention, it can be seen that if the speed of the antenna is controlled by the frequency of the identity tone signal, no beat or distortion will be introduced into the identity tone signal. This may be accomplished by a circuit as illustrated in Fig. 5. Pulse generator 10 which may be a 1350 cycle per second oscillator feeding a one-shot multivibrator having a 100 microsecond period for a complete cyle is used as the generator for the identity tone signal. This pulse generator 10 triggers a 10:1 countdown pulse divider phantastron 40. Both the delay and recovery time in this phantastron are adjusted so as to provide a square wave having the duration of the positive portion approximately equal to the duration of the negative portion. The output of phantastron 40 at 135 cycles per second is fed into phase discriminator 41 where it is compared in phase with the 135 cycle output from the pulser plate 24 and pickup coil 26. The discriminator 41 is so designed that the pulses from the pulser plate 24 are fed into the primary of pulse transformers 41a and 41b. The secondary windings of these transformers are so connected that a positive pulse is produced at the plate of diode 41c and a negative pulse is produced at the cathode of diode 41d. If the pulses from the pulser plate 24 come in at the positive portion of the square wave, a positive pulse is produced at the output. If the pulses from pulser plate 24 come in at the negative portion of the square wave, a negative pulse is produced at the output. If the pulses from pulser plate 24 overlap equal positive and negative portions of the square wave, the resultant D.C. output is zero. The output of the discriminator 41 is fed into the antenna drive motor 29 where the speed of this antenna drive motor will either increase or decrease depending on the polarity of the discriminator output. This will result in the speed of the antenna rotation being locked in phase with the frequency of the identity tone signal. Consequently, no beat or distortion in the identity tone signal will be produced. Standard synchro or servo units 37 may be used to apply the error signal from the phase discriminator to control the motor 29.

While I have described above the principles of my invention in connection with specific apparatus, it is to be clearly understood that this description is made only by way of example and not as a limitation to the scope of my invention as set forth in the objects thereof and in the accompanying claims.

I claim:

1. A radio navigational system wherein a beacon station transmits positional and identification information to a mobile receiver, comprising antenna means for producing a rotating asymmetrical radiation pattern, means coupled to said antenna means to transmit a reference pulse signal each time said radiation pattern has a predetermined azimuthal orientation, said reference pulse signal having a predetermined repetition frequency, means for generating identity pulse signals for identification information, and said identity pulse signals having a repetition frequency harmonically related to the repetition frequency of said reference pulse signal, means transmitting said identity pulse signals over said antenna means, and means for phase locking said identity pulse generating means and said reference pulse transmitting means.

2. A radio navigational system wherein a beacon station transmits positional and identification information to a mobile receiver, comprising antenna means for producing a rotating asymmetrical radiation pattern, means coupled to said antenna means to transmit a reference pulse signal each time said radiation pattern has a predetermined azimuthal orientation, said reference pulse signals having a predetermined repetition frequency, means for generating identity pulse signals for identification information, and said identity pulse signals having a repetition frequency harmonically related to the repetition frequency of said reference pulse signal, means transmitting said identity pulse signals over said antenna means, and means for phase locking said identity pulse generating means and said reference pulse transmitting means; and a receiver including means for receiving said positional and identification pulse signals, a ringing circuit tuned to the frequency of the identity tone signal and means for applying both the reference pulse signals and the identification pulse signals thereto.

3. A radio navigational system as in claim 1, wherein said antenna means for producing a rotating asymmetrical radiation pattern include means for producing a multilobed antenna pattern.

4. A radio navigational system as in claim 1, wherein said reference pulse signals and said identity pulse signals are harmonically related, said phase locking means include means for applying said reference pulse signals to said identity pulse generating means so as to phase lock the reference pulse with the identity tone pulses harmonically related thereto.

5. A radio navigation system as in claim 1 wherein said reference pulse signals and said identity pulse signals are harmonically related, and wherein said antenna means includes a rotatable member for rotating the directional pattern, and a motor for driving said rotatable member, said phase locking means including a phase discriminator, means for bringing the reference pulse signals and the identity pulse signals to the same fundamental repetition frequency, means for applying the resultant identity pulse signal and reference pulse signal of the same fundamental repetition frequency to said phase discriminator, and means responsive to the output of said discriminator for controlling the speed of said motor.

6. A radio navigational system as in claim 5, wherein said means for bringing the reference pulse signals and the identity pulse signals to the same fundamental frequency includes a count-down frequency divider which is coupled to the identity pulse generator to produce an output pulse signal which is of the same frequency as the reference pulse signal.

No references cited.